US011321792B2

(12) United States Patent
Nadler et al.

(10) Patent No.: US 11,321,792 B2
(45) Date of Patent: May 3, 2022

(54) ENFORCEABLE CONTRACT GENERATION

(71) Applicant: International Business Machines Corporation, Armonk, NY (US)

(72) Inventors: Sima Nadler, Ta (IL); Ziv Nevo, Yokneam Ilit (IL); Karen Frida Yorav, Haifa (IL); Roee Shlomo, Petah Tikva (IL); Tomer Solomon, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/001,759

(22) Filed: Aug. 25, 2020

(65) Prior Publication Data

US 2022/0067858 A1    Mar. 3, 2022

(51) Int. Cl.
*G06Q 50/18*    (2012.01)
*G06F 9/445*    (2018.01)
*H04L 41/5006*    (2022.01)

(52) U.S. Cl.
CPC ............ *G06Q 50/18* (2013.01); *G06F 9/445* (2013.01); *H04L 41/5006* (2013.01)

(58) Field of Classification Search
CPC ...... G06Q 50/18; G06F 9/445; H04L 41/5006
See application file for complete search history.

(56) References Cited

U.S. PATENT DOCUMENTS 7,167,844 B1    1/2007    Leong et al.

OTHER PUBLICATIONS

Na, Generate Your Documents and Contracts in a Few Clicks with Galexy, Legal Suite.
Na, 9 Stages of Contract Lifecycle Management, Contract Experience.
Ying Jin ; Zepeng Li ; Da Wei ; Lei Liu, Automatic Generation and Enforcement of Security Contract for Pervasive Application, Dec. 17, 2008.
Na, Co-Creation Smart Contract Acceleration Engine, An IP.com Prior Art Database, Jan. 23, 2020.

*Primary Examiner* — Nader Bolourchi
(74) *Attorney, Agent, or Firm* — Ziv Glazberg

(57) ABSTRACT

A method, product and system including obtaining metadata associated with at least one plugin of a runtime environment, wherein the runtime environment is configured to provide a service to a client, wherein the plugin is configured to measure or enforce metrics of the service; obtaining user selections regarding the metrics, wherein the user selections comprise constraints on the runtime environment; obtaining, based on the metadata of the plugin and based on the user selections, corresponding clauses textually describing the constraints; generating a contract, wherein the contract comprises the corresponding clauses; automatically generating a configuration file based on the user selections; and automatically enforcing the contract by: activating the runtime environment, loading the service in the runtime environment, configuring the plugin according to the configuration file, executing the plugin to identify a violation of the contract, and executing a client function of the client.

20 Claims, 8 Drawing Sheets

ENFORCEABLE CONTRACT GENERATION

TECHNICAL FIELD

The present disclosure relates to generating enforceable contracts in general, and to systems, products, and methods for generating and utilizing enforceable service provisioning contracts, in particular.

BACKGROUND

Contracts are legal documents that are typically generated by lawyers. A service provisioning contract may refer to a contract between a service provider and a service receiver regarding providing the service from the service provider to the service receiver. As an example, a service provisioning contract may include a data sharing contract between a data provider and a data client, which may be used in some scenarios for healthcare purposes, such as where patient data can be shared among institutions for improving treatment decisions. Other service provisioning contracts, data sharing contracts, internet providing contracts, or the like, may be used in a plurality of scenarios.

BRIEF SUMMARY

One exemplary embodiment of the disclosed subject matter is a method comprising: obtaining metadata associated with at least one plugin from a set of plugins of a runtime environment, wherein the runtime environment is configured to provide a service to a client, wherein the at least one plugin is configured to measure or enforce one or more metrics of the service; obtaining one or more user selections regarding the one or more metrics, wherein the one or more user selections comprise one or more constraints on the runtime environment; obtaining, based on the metadata of the at least one plugin and based on the one or more user selections, one or more corresponding clauses textually describing the one or more constraints; generating a contract, wherein the contract comprises the one or more corresponding clauses; automatically generating a configuration file based on the one or more user selections; and automatically enforcing the contract at least by: activating the runtime environment, loading the service in the runtime environment, configuring the at least one plugin according to the configuration file, executing the at least one plugin to identify a violation of the contract, and executing a client function of the client.

Optionally, the method comprises identifying the violation of the contract, wherein said identifying is performed by a plugin of the at least one plugin that is deployed in a wrapper wrapping the client function.

Optionally, the method comprises performing a responsive action upon identifying the violation, wherein the responsive action comprises at least one of generating an alert or terminating the service.

Optionally, the metadata comprises, for each plugin of the at least one plugin, at least one of: a description of the plugin, a description of a capability associated with the plugin, and a manner of enforcing a constraint on the capability.

Optionally, the method comprises executing a template generator on the metadata to generate a contract template comprising input fields that are associated with the one or more metrics, wherein the contract template is associated with the at least one plugin, wherein the input fields enable the client to provide the one or more user selections by inserting the one or more user selections to the input fields, and adding the contract template to a contract template repository that is accessible to the client, wherein the one or more corresponding clauses are generated based on the contract template with the one or more user selections.

Optionally, the service comprises a data service, wherein the at least one plugin comprises a data quality plugin that is configured to measure or enforce a data quantity metric of the service and a data freshness metric of the service, wherein the at least one constraint comprises a quality threshold, wherein the one or more corresponding clauses textually define the quality threshold, wherein the data quality plugin is configured to determine whether a data quality of provided data complies with the quality threshold.

Optionally, the service comprises a data service, wherein the at least one plugin comprises an anonymization plugin that is configured to measure or enforce an anonymization metric of the service provider, wherein the anonymization metric defines one or more anonymization levels, wherein the at least one constraint comprises an anonymization level selection from the one or more anonymization levels, wherein the one or more corresponding clauses textually define that the service must comply with the anonymization level selection, wherein the anonymization plugin is configured to determine whether the measured level complies with the anonymization level selection.

Optionally, the service comprises a data service, wherein the at least one plugin comprises a service-level agreement (SLA) plugin that is configured to measure or enforce a SLA metric of the service defining one or more SLA levels of the service, wherein the at least one constraint comprises a SLA level selection from the one or more SLA levels, wherein the one or more corresponding clauses textually define the SLA level selection, wherein the SLA plugin is configured to determine whether a SLA level of provided data complies with the SLA level selection.

Optionally, the service comprises a data service, wherein the at least one plugin comprises a client usage plugin that is configured to measure or enforce a data usage metric of the service, wherein the at least one constraint comprises one or more allowed usages, wherein the one or more corresponding clauses textually define the one or more allowed usages, wherein the client usage plugin is configured to determine whether a usage of provided data complies with the one or more allowed usages.

Optionally, the one or more allowed usages define that the provided data can only be directed to one or more memory locations.

Optionally, the method comprises generating the set of plugins at least by containerizing software of the at least one plugin together with the metadata using a container technology.

Optionally, the method comprises retrieving the at least one plugin and the metadata that is associated thereto from a plugin repository comprising the set of plugins of the runtime environment; and generating a contract template based on the metadata, wherein the contract template is generated to include plugin clauses textually describing the at least one plugin.

Optionally, the method comprises obtaining a contract template from a contract template repository, wherein said generating the contract is performed based on the contract template; and legally signing the contract with the service provider to obtain access to the runtime environment that enables to perform said automatically enforcing.

Optionally, the contract defines that the service is to be provided during a service period, wherein said automatically enforcing is performed during the service period.

Another exemplary embodiment of the disclosed subject matter is a computer program product comprising a non-transitory computer readable storage medium retaining program instructions, which program instructions when read by a processor, cause the processor to perform: obtaining metadata associated with at least one plugin from a set of plugins of a runtime environment, wherein the runtime environment is configured to provide a service to a client, wherein the at least one plugin is configured to measure or enforce one or more metrics of the service; obtaining one or more user selections regarding the one or more metrics, wherein the one or more user selections comprise one or more constraints on the runtime environment; obtaining, based on the metadata of the at least one plugin and based on the one or more user selections, one or more corresponding clauses textually describing the one or more constraints; generating a contract, wherein the contract comprises the one or more corresponding clauses; automatically generating a configuration file based on the one or more user selections; and automatically enforcing the contract at least by: activating the runtime environment, loading the service in the runtime environment, configuring the at least one plugin according to the configuration file, executing the at least one plugin to identify a violation of the contract, and executing a client function of the client.

Optionally, the program instructions, when read by a processor, cause the processor to identify the violation of the contract, wherein said identifying is performed by a plugin of the at least one plugin that is deployed in a wrapper wrapping the client function.

Optionally, the program instructions, when read by a processor, cause the processor to perform a responsive action upon identifying the violation, wherein the responsive action comprises at least one of generating an alert or terminating the service.

Optionally, the metadata comprises, for each plugin of the at least one plugin, at least one of: a description of the plugin, a description of a capability associated with the plugin, and a manner of enforcing a constraint on the capability.

Optionally, the program instructions, when read by a processor, cause the processor to execute a template generator on the metadata to generate a contract template comprising input fields that are associated with the one or more metrics, wherein the contract template is associated with the at least one plugin, wherein the input fields enable the client to provide the one or more user selections by inserting the one or more user selections to the input fields, and add the contract template to a contract template repository that is accessible to the client, wherein the one or more corresponding clauses are generated based on the contract template with the one or more user selections.

Optionally, the service comprises a data service, wherein the at least one plugin comprises a data quality plugin that is configured to measure or enforce a data quantity metric of the service and a data freshness metric of the service, wherein the at least one constraint comprises a quality threshold, wherein the one or more corresponding clauses textually define the quality threshold, wherein the data quality plugin is configured to determine whether a data quality of provided data complies with the quality threshold.

Optionally, the service comprises a data service, wherein the at least one plugin comprises an anonymization plugin that is configured to measure or enforce an anonymization metric of the service provider, wherein the anonymization metric defines one or more anonymization levels, wherein the at least one constraint comprises an anonymization level selection from the one or more anonymization levels, wherein the one or more corresponding clauses textually define that the service must comply with the anonymization level selection, wherein the anonymization plugin is configured to determine whether the measured level complies with the anonymization level selection.

Optionally, the service comprises a data service, wherein the at least one plugin comprises a service-level agreement (SLA) plugin that is configured to measure or enforce a SLA metric of the service defining one or more SLA levels of the service, wherein the at least one constraint comprises a SLA level selection from the one or more SLA levels, wherein the one or more corresponding clauses textually define the SLA level selection, wherein the SLA plugin is configured to determine whether a SLA level of provided data complies with the SLA level selection.

Optionally, the service comprises a data service, wherein the at least one plugin comprises a client usage plugin that is configured to measure or enforce a data usage metric of the service, wherein the at least one constraint comprises one or more allowed usages, wherein the one or more corresponding clauses textually define the one or more allowed usages, wherein the client usage plugin is configured to determine whether a usage of provided data complies with the one or more allowed usages.

Optionally, the one or more allowed usages define that the provided data can only be directed to one or more memory locations.

Optionally, the program instructions, when read by a processor, cause the processor to generate the set of plugins at least by containerizing software of the at least one plugin together with the metadata using a container technology.

Optionally, the program instructions, when read by a processor, cause the processor to retrieve the at least one plugin and the metadata that is associated thereto from a plugin repository comprising the set of plugins of the runtime environment; and generate a contract template based on the metadata, wherein the contract template is generated to include plugin clauses textually describing the at least one plugin.

Optionally, the program instructions, when read by a processor, cause the processor to obtain a contract template from a contract template repository, wherein said generating the contract is performed based on the contract template; and legally sign the contract with the service provider to obtain access to the runtime environment that enables to perform said automatically enforcing.

Optionally, the contract defines that the service is to be provided during a service period, wherein said automatically enforcing is performed during the service period.

Yet another exemplary embodiment of the disclosed subject matter is a system, the system comprising a processor and coupled memory, the processor being adapted to perform: obtaining metadata associated with at least one plugin from a set of plugins of a runtime environment, wherein the runtime environment is configured to provide a service to a client, wherein the at least one plugin is configured to measure or enforce one or more metrics of the service; obtaining one or more user selections regarding the one or more metrics, wherein the one or more user selections comprise one or more constraints on the runtime environment; obtaining, based on the metadata of the at least one plugin and based on the one or more user selections, one or more corresponding clauses textually describing the one or more constraints; generating a contract, wherein the contract comprises the one or more corresponding clauses; automatically generating a configuration file based on the one or more user selections; and automatically enforcing the contract at least by: activating the runtime environment, loading the service in the runtime environment, configuring the at least one plugin according to the configuration file, executing the at least one plugin to identify a violation of the contract, and executing a client function of the client.

Optionally, the processor is adapted to identify the violation of the contract, wherein said identifying is performed by a plugin of the at least one plugin that is deployed in a wrapper wrapping the client function.

Optionally, the processor is adapted to perform a responsive action upon identifying the violation, wherein the responsive action comprises at least one of generating an alert or terminating the service.

Optionally, the metadata comprises, for each plugin of the at least one plugin, at least one of: a description of the plugin, a description of a capability associated with the plugin, and a manner of enforcing a constraint on the capability.

Optionally, the processor is adapted to execute a template generator on the metadata to generate a contract template comprising input fields that are associated with the one or more metrics, wherein the contract template is associated with the at least one plugin, wherein the input fields enable the client to provide the one or more user selections by inserting the one or more user selections to the input fields, and add the contract template to a contract template repository that is accessible to the client, wherein the one or more corresponding clauses are generated based on the contract template with the one or more user selections.

Optionally, the service comprises a data service, wherein the at least one plugin comprises a data quality plugin that is configured to measure or enforce a data quantity metric of the service and a data freshness metric of the service, wherein the at least one constraint comprises a quality threshold, wherein the one or more corresponding clauses textually define the quality threshold, wherein the data quality plugin is configured to determine whether a data quality of provided data complies with the quality threshold.

Optionally, the service comprises a data service, wherein the at least one plugin comprises an anonymization plugin that is configured to measure or enforce an anonymization metric of the service provider, wherein the anonymization metric defines one or more anonymization levels, wherein the at least one constraint comprises an anonymization level selection from the one or more anonymization levels, wherein the one or more corresponding clauses textually define that the service must comply with the anonymization level selection, wherein the anonymization plugin is configured to determine whether the measured level complies with the anonymization level selection.

Optionally, the service comprises a data service, wherein the at least one plugin comprises a service-level agreement (SLA) plugin that is configured to measure or enforce a SLA metric of the service defining one or more SLA levels of the service, wherein the at least one constraint comprises a SLA level selection from the one or more SLA levels, wherein the one or more corresponding clauses textually define the SLA level selection, wherein the SLA plugin is configured to determine whether a SLA level of provided data complies with the SLA level selection.

Optionally, the service comprises a data service, wherein the at least one plugin comprises a client usage plugin that is configured to measure or enforce a data usage metric of the service, wherein the at least one constraint comprises one or more allowed usages, wherein the one or more corresponding clauses textually define the one or more allowed usages, wherein the client usage plugin is configured to determine whether a usage of provided data complies with the one or more allowed usages.

Optionally, the one or more allowed usages define that the provided data can only be directed to one or more memory locations.

Optionally, the processor is adapted to generate the set of plugins at least by containerizing software of the at least one plugin together with the metadata using a container technology.

Optionally, the processor is adapted to retrieve the at least one plugin and the metadata that is associated thereto from a plugin repository comprising the set of plugins of the runtime environment; and generating a contract template based on the metadata, wherein the contract template is generated to include plugin clauses textually describing the at least one plugin.

Optionally, the processor is adapted to obtain a contract template from a contract template repository, wherein said generating the contract is performed based on the contract template; and legally sign the contract with the service provider to obtain access to the runtime environment that enables to perform said automatically enforcing.

Optionally, the contract defines that the service is to be provided during a service period, wherein said automatically enforcing is performed during the service period.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
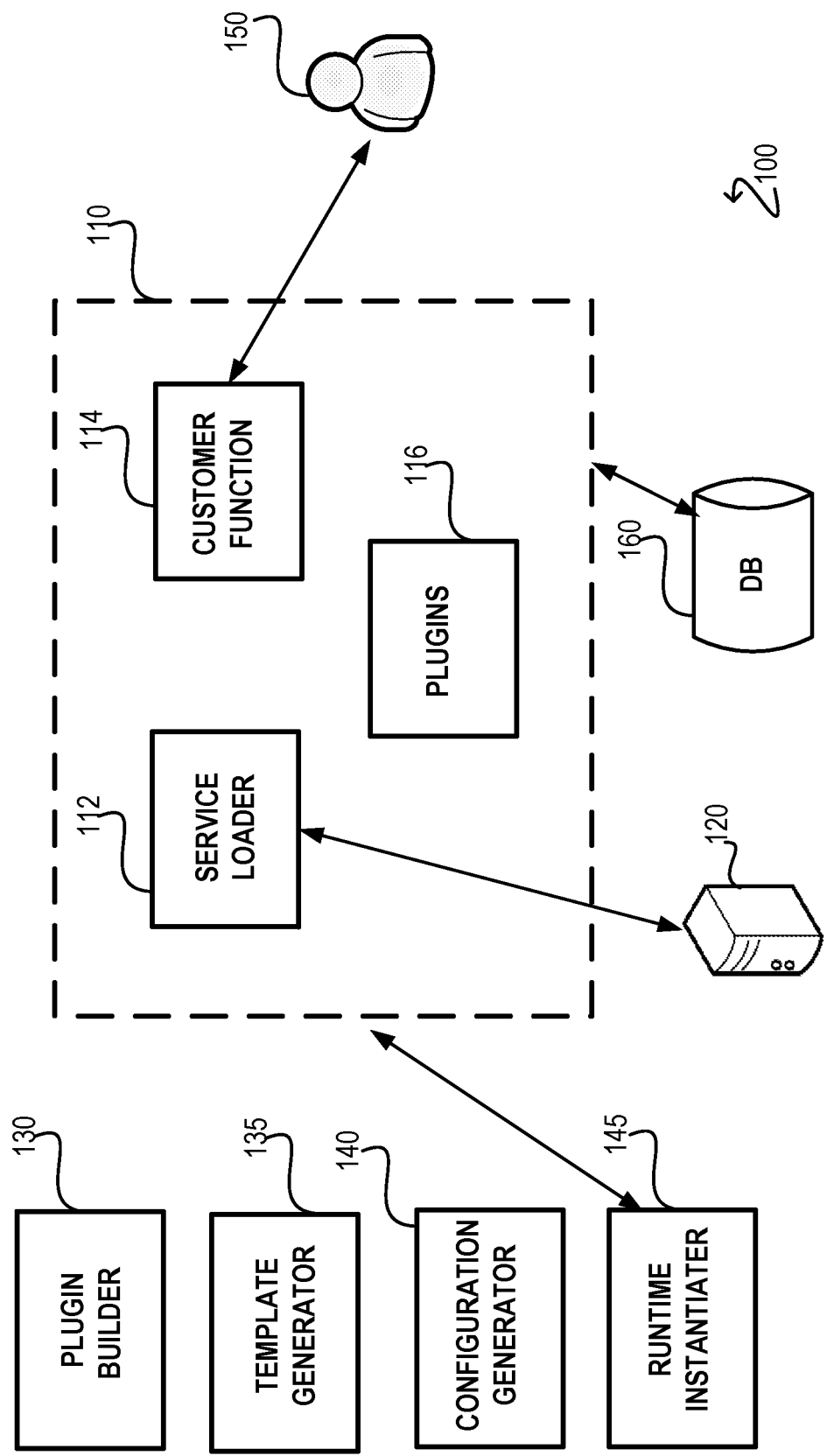
FIG. 1 illustrates a schematic illustration of an exemplary environment and architecture in which the disclosed subject matter may be utilized, in accordance with some exemplary embodiments of the disclosed subject matter.

One technical problem dealt with by the disclosed subject matter is generating service provisioning contracts, e.g., automatically. In some exemplary embodiments, generating service provisioning contracts may be a complex and time-consuming process, typically requiring highly trained experts such as legal experts. In some exemplary embodiments, service provisioning contracts may typically be drafted by lawyers with limited knowledge of what is technically enforceable and may require the costly negotiation of legal agreements. It may be desired to enable to automatically generate enforceable service provisioning contracts, e.g., with minimal reliance on lawyers or other manual human resources which may be expensive and time consuming.

In some exemplary embodiments, a service provisioning scenario may typically involve a service requester, a service provider, and the service itself. In some exemplary embodiments, the service requester and service provider may consist of different corporations or firms, different entities from a same corporation, or the like. For example, the service may comprise data that may be requested for distribution by a service requester such as a taxi company, from a service provider such as the city municipality. In some exemplary embodiments, a service provider may have a service provisioning platform or environment which may enable clients to obtain the service.

In some exemplary embodiments, service requesters may wish to sign a legally binding agreement or contract with the service provider, and vice versa. In some cases, a data distributer or requester would likely wish to be notified in case the data quality that is provided is below a required level, or in case any technical condition that is specified in a data sharing agreement is breached. For example, a contract that includes a commitment of a service provider to perform a function that the service provider cannot implement, may cause future breaches of the contract since the commitment can technically not be complied with. In some exemplary embodiments, enforcing agreements may typically require costly litigation, and managing a large number of such legal data sharing agreements may be challenging.

Another technical problem dealt with by the disclosed subject matter is generating enforceable service provisioning contracts. In some exemplary embodiments, it may be difficult to automatically enforce a service provisioning contract, for example, since typically such contracts are not technically actionable. In some exemplary embodiments, service provisioning contracts may include legal documents whose clauses may or may not be measurable or enforceable at a technical level. For example, for a data service, the quantity of the data may be technically measurable. In many cases, service provisioning contracts may be difficult to track, manage or enforce. It may be desired to enable both signing parties to automatically monitor and enforce a service provisioning contract for scenarios where either the service provider or the service requester breach the contract.

Yet another technical problem dealt with by the disclosed subject matter is to build or create a contract from technical building blocks that correspond to capabilities of a service provisioning environment, instead of creating a textual contract that is not necessarily consistent with the technical building blocks. It may be desired to ensure that the technical building blocks are the basis of the contract, and that they are measurable and enforceable so that commitments of the service provider can be met by the technical building blocks.

One technical solution is to generate a contract that is based, a priori, on technical building blocks of a service provisioning environment. In some exemplary embodiments, the contract may comprise a service-provisioning contract that may have one or more measurable technical metrics. In some exemplary embodiments, the contract may be automatically generated to be at least partially enforceable, e.g., at a technical level. In some exemplary embodiments, instead of trying to measure and enforce an existing legal contract, an enforceable contract may be generated based on the technical building blocks that match the capabilities of the service provisioning environment, thus making it suitable for real time measurement and enforcement.

In some exemplary embodiments, a service provisioning environment may have one or more technical capabilities, which may be measured, enforced, implemented, or the like, by the technical building blocks (also referred to as software plugins). In some exemplary embodiments, one or more software plugins that are configured to enforce or measure capabilities of the service provider may be selected, generated, obtained, or the like. In some exemplary embodiments, each software plugin may measure, implement, and/or enforce a metric, a parameter, or the like, of a capability of the service provisioning environment, of one or more services which may be provided at the environment, or the like. In some exemplary embodiments, clauses of the contract may be generated to match the capabilities of the service provisioning environment and the technical components of the service provisioning environment that are responsible for measuring and enforcing terms of the clauses.

In some exemplary embodiments, a contract may be generated by selecting capabilities that are relevant for a desired contract type. For example, for a data distribution service, data-related capabilities such as data monitoring capabilities may be selected. In some exemplary embodiments, a set of software plugins of a service provisioning environment may be generated, created, obtained, or the like, to implement, measure or enforce aspects of the selected capabilities. In some exemplary embodiments, the set of software plugins may be associated with the selected capabilities of the service provisioning environment. In some exemplary embodiments, at least one plugin from the set of plugins may be selected, obtained, utilized, or the like, for generating a contract template that matched the plugin.

In some exemplary embodiments, for each plugin of the at least one selected or obtained plugin, one or more corresponding plugin clauses that textually describe the functionality of the plugin, a capability associated with the plugin, or the like, may be generated. In some exemplary embodiments, the plugin clauses may be generated based on metadata associated with each plugin that may describe the plugin. In some exemplary embodiments, each selected plugin may be directly linked to one or more associated plugin clauses of the contract, e.g., that includes at least a portion that is measurable, implementable, and/or enforceable by the plugin. In some exemplary embodiments, the linked plugin clauses may be used for generating a contract template, which may constitute a basis for a legally binding contract.

In some exemplary embodiments, after obtaining the plugins and associated clauses, additional clauses or portions thereof may be added to a contract template, e.g., for legal purposes, based on local requirements, or the like. In some exemplary embodiments, the additional clauses or portions thereof may include untechnical portions that are legally useful, static portions that are based on static information such as information about the service provider, or the like.

In some exemplary embodiments, after generating contract templates based on selected plugins, which may be accessible to one or more clients, a client may select a contract template and provide user input thereto. In some exemplary embodiments, the user input may comprise one or more user selections or inputs associated with the at least one plugin, with capabilities of the service provisioning environment, determining configurations of the service provisioning environment, or the like. In some exemplary embodiments, in addition to the user selections that are associated with the at least one plugin, the user may provide additional input such as information regarding the client (e.g., a firm), the user (e.g., an employee at the firm), or the like. In some exemplary embodiments, the one or more user selections, including the user selections that are associated with the at least one plugin as well as any other user input, may be obtained from the client. In some exemplary embodiments, the user input may comprise at least one constraint on implementing the capabilities that are associated with the at least one plugin, at least one constraint on a runtime environment, one or more value selection for metrics parameters of the service, or the like.

In some exemplary embodiments, a configuration file (also referred to as "runtime specification file") comprising the at least one constraint of the user input may be automatically generated, e.g., based on the user input. In some exemplary embodiments, the configuration file may be configured to generate a runtime environment enabling access to the service, execution of the plugins, performing customer functionalities, or the like, according to the user's selected configuration indicated by the user input.

In some exemplary embodiments, the runtime environment may be executed in order to monitor and enforce compliance with the contract in real time, e.g., so that any breach or violation of the contract may be identified during the service provisioning period, e.g., in which the service may be provided. In some exemplary embodiments, upon identifying a violation of the contract, one or more responsive actions may be performed such as terminating the contract, terminating the service, employing a monetary punishment, providing a monetary compensation, presenting an alert, or performing any other responsive actions according to the terms described in the contract.

In some exemplary embodiments, the contract may be automatically enforced by instantiating a runtime environment according to the configurations of the generated runtime specification file. In some exemplary embodiments, the runtime environment may enable a service to be provided from one or more servers or computing devices. The service may be loaded by a loading component of the runtime environment. For example, for a certain type of service that was selected, e.g., a machine learning model, the loading component may load the machine learning model.

In some exemplary embodiments, the at least one plugin may be executed in the runtime environment according to the runtime specification file. In some cases, the at least one plugin may enforce one or more terms, parameter values, parameter selections, or the like, that are defined in the runtime specification file. In some cases, the at least one plugin may measure one or more metrics of the service that is loaded by the service loader and compare the measurements to thresholds or values that are defined in the runtime specification file. In some exemplary embodiments, the service measurements may be compared to the at least one constraint to identify a violation of the contract, or compliance with the contract.

In some exemplary embodiments, a customer function may be executed in the runtime environment. In some exemplary embodiments, the customer function may be generated or obtained from the customer and may utilize the service to perform one or more functionalities that are useful for the customer. In some exemplary embodiments, the runtime environment may wrap the customer function with a wrapper which may enable one or more components of the runtime environment to monitor actions performed by the customer function. In some cases, a runtime agent such as a plugin may be deployed within the wrapper wrapping the customer function, e.g., in order to monitor and identify violations of the contract, enforce compliance with the contract, or the like.

In some exemplary embodiments, a responsive action may be performed upon identifying a violation of the contract. For example, violations of a contract may include identifying that a service provided by a service provider has a lower quality than a quality constraint that is defined in the agreement, that a service client has attempted to use the service at a higher rate than stipulated in the agreement, that the service provider has not provided the required service, or the like. In some exemplary embodiments, the responsive action may include generating an alert, terminating the service, terminating the contract, or the like. In some exemplary embodiments, the responsive action may be defined by the contract.

One technical effect of utilizing the disclosed subject matter is generating enforceable service-provisioning agreements. In some exemplary embodiments, the disclosed subject matter enables to generate legal service-provisioning agreements automatically with enforcing technical components that are responsible for measuring and/or enforcing terms of the agreements. In some exemplary embodiments, instead of trying to enforce an existing legal contract, the contract provided by the disclosed subject matter is generated based on the capabilities of the service provider in a manner that ensures that the terms can be technically enforced.

Another technical effect of utilizing the disclosed subject is providing a runtime environment for a contract that can monitor and enforce terms of the contract. In some exemplary embodiments, the disclosed subject enables to automatically track, manage, and enforce service provisioning agreements, e.g., to ensure that usage of the service by the client in the runtime environment complies with the contract. In some exemplary embodiments, the terms in the service-provisioning agreements may be automatically monitored and enforced by the disclosed subject matter. For a data service, the disclosed subject provides a secure runtime environment that enables to share the data with the client and to monitor usage of the data at the wrapped customer function.

Yet another technical effect of utilizing the disclosed subject matter is evaluating in real time technical compliance with the contract. The disclosed subject matter may enable to monitor a quality of the provided service, a quantity of the provided service, or the like, in real time, and compare the measured service metrics with conditions of the contract to identify violations.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing an environment, in accordance with some exemplary embodiments of the disclosed subject matter.

Environment 100 may be a secure and privacy enabled environment, or any other environment. In some exemplary embodiments, components of Environment 100 communicate with each other via a Computerized Network, such as a Wide Area Network (WAN), a Local Area Network (LAN), a wireless network, the Internet, an intranet, or the like.

In some exemplary embodiments, Environment 100 may comprise a Server 120. Server 120 may be one or more computing devices, remote servers, Domain Name System (DNS) servers, Gateway (GW) servers, virtual private network (VPN) servers, Personal Computers (PCs), or the like. In some exemplary embodiments, Server 120 may be configured to provide one or more types of services such as a virtual service, a computing service, a network service, or the like. In some exemplary embodiments, Server 120 may be associated with a service provisioning corporation, firm or company, such as a data sharing service. In some exemplary embodiments, the service provider may offer to customers such as Customer 150 the service from Server 120.

In some exemplary embodiments, Runtime Environment 110 may operate the service provisioning functions of the service provider. In some exemplary embodiments, Server 120 may be configured to provide to Runtime Environment 110 the service, access to the service, one or more functionalities of the service, or the like. For example, Server 120 may be configured to retain data and provide the data to clients of the service provider.

Environment 100 may comprise a customer, client, or service receiver, or the like such as Customer 150 that may wish to sign a contract with the service provider regarding a usage of the service that is offered by the service provider. Customer 150 may be a human, a corporation, a firm, a company, or the like. For example, for a data service, Customer 150 may include a data scientist.

In some exemplary embodiments, Runtime Environment 110 may include an execution platform or environment that comprises one or more executable components. In some exemplary embodiments, Runtime Environment 110 may comprise a Service Loader 112 which may be configured to load a service, e.g., a data service, from Server 120.

In some exemplary embodiments, Runtime Environment 110 may comprise a Customer Function 114 which may enable to utilize the service from Service Loader 112 in real time according to Customer 150's needs. In some exemplary embodiments, Customer Function 114 may comprise a computer program, a software code, or the like, which may be configured to perform one or more functionalities that are useful for Customer 150. In some exemplary embodiments, Customer Function 114 may be wrapped with a wrapper, e.g., enabling one or more components of Runtime Environment 110 such as Plugins 116 to track and monitor activities of the Customer Function 114, e.g., a data bandwidth that is inputted or outputted from Customer Function 114.

In some exemplary embodiments, Runtime Environment 110 may comprise one or more software Plugins 116, each of which may be used to measure, implement and/or enforce a particular capability or metric of Runtime Environment 110. For example, a Plugin 116 may be configured to track and monitor actions performed by Customer Function 114, to measure one or more metrics of the service loaded by Service Loader 112, to enforce rules and terms associated with the measure metrics, or the like.

Environment 100 may comprise DB 160. In some exemplary embodiments, DB 160 may comprise one or more repositories or databases.

Environment 100 may comprise a Plugin Builder 130 which may be configured to generate or manage one or more container plugins. In some exemplary embodiments, each software plugin of Plugins 116 may comprise a software program that is implemented in a programming language, environment, or the like. In some exemplary embodiments, Plugin Builder 130 may convert the software program of each Plugin 116 to container images consisting independent software units that may be executed on one or more execution platforms or environments, e.g., using one or more container technologies such as Docker™, Core OS rkt™, Mesos Containerizer™, or the like. In some exemplary embodiments, converting the software of the plugins to independent units may enable each software unit to be executed, with its dependencies, isolated from other processes, such as using a virtualization system, or other container runtime environments. For example, a plugin may be converted to a docker image that can be executed in a Docker™ execution environment.

In some exemplary embodiments, Plugin Builder 130 may generate Plugins 116 by associating or adding metadata to each Plugin 116, e.g., indicating a functionality of Plugin 116, a capability of Runtime Environment 110 that is associated with Plugin 116, legal implication of Plugin 116, enforcement means of Plugin 116, or the like. The metadata may be included explicitly within Plugin 116. Additionally or alternatively, the metadata may be pointed to indirectly by Plugin 116, such as pointed to an external repository. Additionally or alternatively, the metadata may be retained in a separate location and may be located for each Plugin 116, such as using a unique identifier of Plugin 116. In some exemplary embodiments, a plugin that has metadata that is relevant for contracting purposes, may be referred to as "contractable". As an example, a docker image of such plugin may be referred to as contractable docker image.

Environment 100 may comprise a Template Generator 135 configured to generate one or more contract templates based on plugins obtained from Plugin Builder 130. In some exemplary embodiments, the metadata of Plugins 116 may be used by Template Generator 135 to generate relevant associated clauses of the contract. In some exemplary embodiments, after contract templates are generated, they may be retained in one or more template databases or repositories in DB 160.

An operator of Template Generator 135 may have access to DB 160 and may enable to view, design, update, delete, and archive contract templates, thereby controlling a lifecycle of the contract templates in DB 160. In some exemplary embodiments, Template Generator 135 may enable an operator to approve or reject template usage requests from Customer 150. Template Generator 135 may be operated automatically based on rules, heuristics, or the like, or manually by an operator, a programmer, a worker, or the like, of the service provider firm.

In some exemplary embodiments, Customer 150 may view available templates generated by Template Generator 135, e.g., in a template repository retained by DB 160. In some exemplary embodiments, Customer 150 may request to use a chosen template type in order to sign a contract with the service provider. Upon approval, a contract copy may be made available to Customer 150 and enable Customer 150 to fill in the contract with user input. In some exemplary embodiments, upon signing of the contract between the parties, e.g., automatically or manually, the contract may be retained as an active contract in a contract database, e.g., in DB 160. In some exemplary embodiments, Customer 150, as well as the service provider, may activate, pause, or terminate the contract after signing the contract, e.g., according to term of the contract.

Environment 100 may comprise a Configuration Generator 140. Upon signing of a contract, in addition to retaining the contract in the contract database, Configuration Generator 140 may be configured to generate a runtime specification file, a configuration file, or the like, according to the user inputs, to Plugins 116, or the like.

Environment 100 may comprise a Runtime Instantiator 145. Based on the runtime specification file, Runtime Instantiator 145 may generate an instance of Runtime Environment 110 and configure parameters thereof according to values of the runtime specification file. In some exemplary embodiments, an operator of the service provider may be able to control and manage the lifecycle of each contract, the lifecycle of the instance of Runtime Environment 110, Plugins 116, the runtime specification file, or the like.

In some exemplary embodiments, DB 160 may comprise a plugins database or repository comprising Plugins 116 that may measure of perform functionalities of the service provider, e.g., generated by Plugin Builder 130, obtained from Server 120, or obtained from any other location or device. In some exemplary embodiments, DB 160 may comprise a templates database or repository comprising a plurality of contract templates which may be generated by Template Generator 135, obtained from Server 120, or obtained from any other location or device. In some exemplary embodiments, DB 160 may comprise a contracts database or repository comprising a plurality of active contracts that were signed between clients and the service provider. In some exemplary embodiments, the contracts database may retain, for each signed contract, a corresponding runtime specification file indicating a selected configuration for Runtime Environment 110. In some exemplary embodiments, DB 160 may comprise any other database or repository.

In some exemplary embodiments, during an active period of the contract, Customer 150, as well as the service provider, may monitor Runtime Environment 110. Specifically, both parties may monitor the status and performance of Plugins 116 in real time, view endpoint details of Plugins 116, view runtime component details, view Customer Function 114 details, identify usage parameters of the service, statistics thereof, or the like. In some exemplary embodiments, Customer 150 may also be enabled to view its own usage of the service, its own monetary transactions, bills, or the like.

Figure 2:
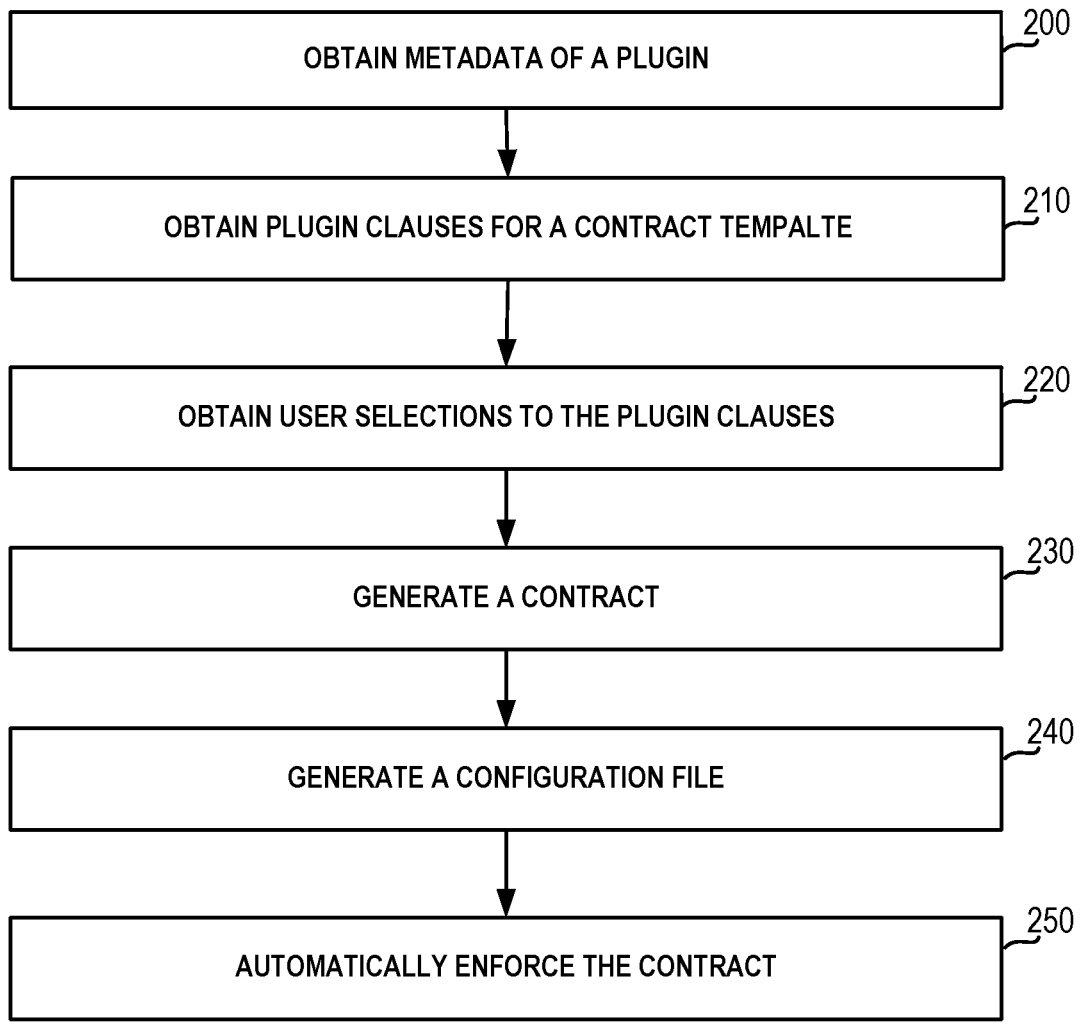
FIG. 2 illustrates a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On step 200, at least one software plugin, or metadata thereof, may be obtained or selected from a set of software plugins of a service provider. In some exemplary embodiments, the set of software plugins may be associated with a corresponding set of metrics or capabilities of a runtime environment. In some exemplary embodiments, the runtime environment may be configured to provide a service to a client. In some exemplary embodiments, software plugins, their associated metadata, or a combination thereof, may be obtained or selected, e.g., from a plugin portal, a plugin database, a repository, a network, a server, a user, or the like.

In some exemplary embodiments, the software plugins, as well as the associated metadata, may be generated or created by a software programmer, a software developer, or the like, before being added to a plugin portal or shared with a network, server, or the like.

In some exemplary embodiments, the set of plugins may be configured to measure performance metrics of the runtime environment, to enforce one or more constraints and terms on the runtime environment, to implement capabilities of the runtime environment, or the like. In some exemplary embodiments, each of the software plugins may be used to measure and/or enforce one or more metrics of the runtime environment, the service, or the like.

In some exemplary embodiments, each plugin from the set of plugins may be associated with metadata indicating a functionality of the plugin, a description of the plugin, a description of a capability associated with the plugin, a manner of enforcing a constraint on the capability, enforcement means of the plugin, or the like. In some exemplary embodiments, the set of plugins may be generated by associating, containerizing, or the like, each plugin software with corresponding metadata, e.g., as described in FIG. 4.

On step 210, based on metadata of at least one software plugin, one or more plugin clauses for contract templates may be generated, obtained, created, or the like. In some exemplary embodiments, the one or more plugin clauses may be generated based on textual descriptions in the metadata relating to capabilities and metrics of the runtime environment. In some exemplary embodiments, one or more contract templates comprising the plugin clauses may be generated by a template generator based on the metadata, e.g., as described in FIG. 5. In some exemplary embodiments, each contract template may be associated with metadata of one or more selected software plugins.

In some exemplary embodiments, the template generator may generate one or more contract templates to include terms, conditions, or the like that are associated with using the service of the runtime environment. In some exemplary embodiments, the template generator may be managed by a legal person, an officer such as a data governance officer, by an automated process such as a software tool, or the like.

In some exemplary embodiments, the conditions and terms described by the plugin clauses of the contract templates may be determined to comply with technical capabilities of the runtime environment, with a functionality of the runtime environment, with a type of the service provided by the runtime environment, or the like. For example, a quality commitment option that may be selectable in a contract template may be generated to suit the qualities of service that can be technically provided by the runtime environment. In some exemplary embodiments, in case a change has occurred to the runtime environment, the plugins enable to configure them accordingly. In some exemplary embodiments, the contract template may include input fields, that may enable a user or a client to later insert or provide the one or more user selections, e.g., by inserting the one or more user selections to the input fields.

In some exemplary embodiments, in addition to the plugin clauses, any other additional clauses may be added to the contract template manually, automatically, or the like. For example, standard or legal clauses may be added to the contract template. In some exemplary embodiments, the template generator may add to the generated templates business related clauses, text, or the like, according to a business strategy or requirements of the service provider. In some exemplary embodiments, the template generator may add to the generated templates legal standard clauses such as information about the service provider, jurisdiction information, or the like.

In some exemplary embodiments, after generating the contract template associated with the at least one plugin, the contract template may be retained in the contract template database or repository, e.g., for future use by clients. In some exemplary embodiments, the contract template database may be potentially accessible to one or more clients that may wish to form a legally binding service provisioning contract with the service provider. In some exemplary embodiments, the potential clients may select capabilities or metrics of interest, and associated relevant contract templates that are based on metadata of plugins that measure or enforce the metrics of interest, may be presented or made available to the client. In some exemplary embodiments, a contract template may be selected from the one or more contract templates that were presented or made available, e.g., by the client.

In some exemplary embodiments, contract templates in the contract repository may be requested by clients, e.g., using a request, by selecting available templates, or the like. In some exemplary embodiments, upon receiving an approval of the request, e.g., by an operator of the runtime environment, automatically based on criteria, or the like, a copy of the contract template may be provided to the client. Alternatively, instead of requesting templates, contract templates may be presented or made available to relevant clients only, e.g., based on client parameters such as language, country, contract type, service type, or the like. In other cases, any other criteria may be used to determine which contract templates should be presented or made available to a client. For example, all the contract templates may be made available for all clients.

On step 220, upon obtaining by the client a copy of the selected contract template, e.g., which may be associated with the at least one software plugin, the client may insert one or more user selections to the copy of the contract template. In some exemplary embodiments, one or more input fields of the copy of the contract template may be filled in by the client, e.g., according to the client's preferences, the client's data, or the like. In some exemplary embodiments, filling in the contract copy may comprise selecting or inputting values for parameters that are associated with the at least one plugin, with a metric of the plugin, or the like. In some exemplary embodiments, the one or more user selections may relate to the one or more metrics or capabilities that are measurable or enforceable by the one or more metrics or capabilities, e.g., by defining one or more constraints or thresholds on the allowed metrics' values. For example, user selection may define a minimal bandwidth of the service, a required quality of the service, a maximal number of times the service may be accessed per hour, an allowed usage of the service, or the like. In some exemplary embodiments, the one or more user selections may comprise one or more constraints on the runtime environment, such as on a functionality of the runtime environment, an activity of the runtime environment, or the like.

On step 230, a contract may be generated to include one or more clauses textually describing the one or more constraints on the runtime environment, e.g., based on the contract template. In some exemplary embodiments, the conditions and terms described by the contract's clauses may be determined based on the metadata of the at least one plugin, based on the one or more user selections, based on legal requirements, based on a business policy of the service provider, or the like.

In some exemplary embodiments, a copy of the selected contract template may be modified to include the user selection, the user constraints, or the like, that were provided by the user. In some exemplary embodiments, the contract may be generated based on the modified copy of the selected contract template that includes the user selections, the contract template clauses such as the plugin clauses, the additional clauses, the legal clauses, or the like.

In some exemplary embodiments, the contract may be legally signed between the parties to obtain access to the runtime environment that enables to automatically enforce the contract, to obtain the service, or the like.

Figure 6:
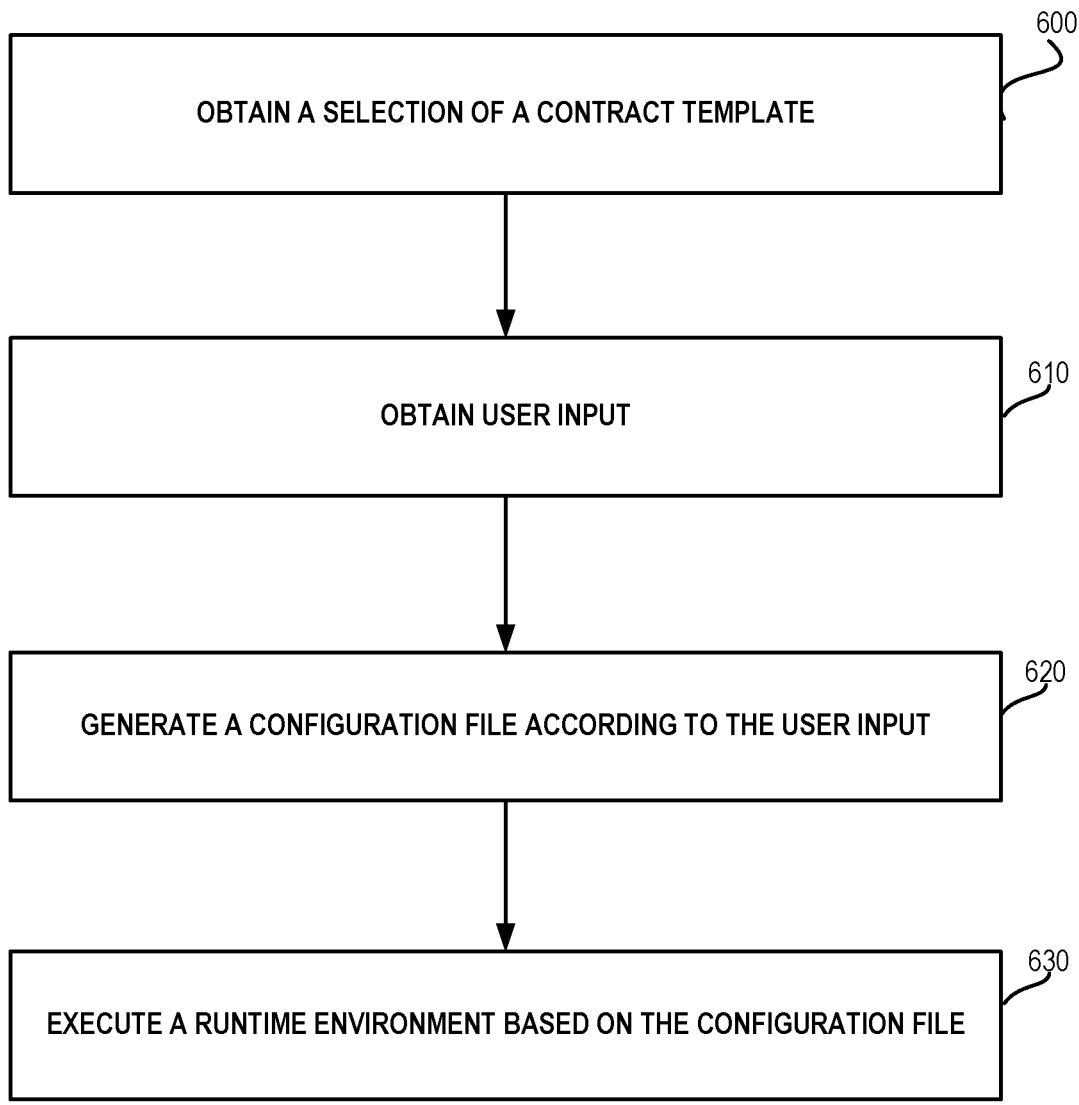
FIG. 6 illustrates a flowchart diagram of a method, in accordance with some exemplary embodiments of the disclosed subject matter.

On step 240, upon signing the contract, a runtime specification file may be automatically generated based on the one or more user selections, e.g., as described in FIG. 6. In some exemplary embodiments, the runtime specification file may enable the client to obtain access to the runtime environment that enables to automatically enforce the contract and provide the service. In some exemplary embodiments, the runtime specification file may indicate the user selections, constraints, preferences, the contract, or the like. In some exemplary embodiments, the runtime specification file may comprise values assigned to parameters or metrics that are configured to be monitored and enforced by the plugins. In some exemplary embodiments, the runtime specification file may describe the selected values for the metrics parameters, the at least one constraint on the runtime environment, or the like.

In some exemplary embodiments, the runtime specification file may comprise a YAML configuration file or any other type of configuration file. In some exemplary embodiments, the runtime specification file may be configured to configure a runtime environment according to the user selections and constraints.

On step 250, the contract may be automatically enforced, e.g., based on the runtime specification file. In some exemplary embodiments, automatically enforcing the contract may include instantiating or activating the runtime environment according to the runtime specification file, e.g., be configuring its components accordingly. In some exemplary embodiments, the contract may define that the service is to be provided during a service period, and automatically enforcing the contract may be performed during the service period.

In some exemplary embodiments, the at least one plugin may be configured based on values in the runtime specification file. In some exemplary embodiments, the configured plugins may be executed to measure or enforce one or more metrics using the selected values for the parameters of the plugins that are defined in the runtime specification file. In some exemplary embodiments, executing the plugins may enable to identify violations of the contract, e.g., as described in FIG. 7. In some exemplary embodiments, the plugins may measure metrics of the service that is provided in the runtime environment, thereby obtaining service measurements. In some exemplary embodiments, the service measurements may be compared to the at least one constraint to identify a violation of the contract, or compliance with the contract.

In some exemplary embodiments, a responsive action may be performed upon identifying a violation of the contract. In some exemplary embodiments, the responsive action may include generating an alert, terminating the service, terminating the contract, or the like. In some exemplary embodiments, the responsive action may be defined by the contract, may be determined based on heuristics, or the like.

In some exemplary embodiments, the service may be loaded to the runtime environment. In some exemplary embodiments, a customer function may be executed in a wrapper of the runtime environment, so that actions of the customer function that may violate the contract may be monitored by a plugin or by any other runtime component of the runtime environment that may be deployed within the wrapper.

In some exemplary embodiments, the client may activate, pause, and terminate the contract after signing the contract. In some exemplary embodiments, during an active period of the contract, the client may monitor the status of live plugins, view plugin endpoint details, view runtime component details, view the customer function details, or the like. In some exemplary embodiments, the client may also view his own usage data, the data quality of his provided service, the service response time, or the like.

In some exemplary embodiments, in some scenarios the service may comprise a data service. In such scenarios, the at least one plugin may comprise one or more data plugins such as a data quality plugin that is associated with a data quantity metric, a freshness metric associated with a freshness of the loaded data, or the like. In some exemplary embodiments, the data quality plugin may be configured to measure or enforce the data quality of the service by measuring in real time the data quantity metric of provided data, the data freshness metric of provided data, or the like, improving the data quality, or the like. In some exemplary embodiments, the at least one constraint of the contract may comprise a quality constraint, e.g., indicating a minimum or maximum threshold for data quality that is to be complied with. In some exemplary embodiments, a corresponding clause in the contract may textually define that the service must comply with the minimum or maximum threshold. In some exemplary embodiments, the data quality plugin may compare data quality measurements to the minimum or maximum threshold to identify a violation of the contract or compliance thereto.

In some exemplary embodiments, in some scenarios the at least one plugin may comprise an anonymization plugin that is configured to measure or enforce an anonymization metric, e.g., by anonymizing data according one or more anonymization levels. In some exemplary embodiments, the anonymization metric may define one or more anonymization levels, and the at least one constraint in the contract may comprise a user selected level of anonymization from the one or more anonymization levels that is required for one or more types of data. In some exemplary embodiments, a corresponding clause in the contract may textually define that the service must comply with the anonymization level selection. In some exemplary embodiments, the anonymization plugin may anonymize data according to the user selected level of anonymization. Alternatively, the anonymization plugin may measure an anonymization level of the data and compare the measured level to the user selected level of anonymization. In some exemplary embodiments, as an example, the anonymization level selection may define that anonymization is to be performed for marketing data that is used for marketing purposes and not for medical data that is used for medical purposes.

In some exemplary embodiments, the at least one plugin may comprise any other data plugin such as a Service-Level Agreement (SLA) plugin that is configured to measure or enforce SLA metrics of provided data, a client usage plugin that is configured to measure or enforce usage of provided data by a client, or any other metric of the data. In some exemplary embodiments, for the SLA plugin, the SLA metric may define one or more SLA levels of the service. In some exemplary embodiments, one or more corresponding clauses of the contract may textually define an SLA level selection from one or more SLA levels. In some exemplary embodiments, the SLA plugin may be configured to determine whether an SLA level of provided data complies with the SLA level selection.

In some exemplary embodiments, the client usage plugin may be configured to measure or enforce a data usage metric of the service. In some exemplary embodiments, a client usage constraint in the contract may define one or more allowed usages for each client, which may be described in one or more corresponding clauses textually defining the one or more allowed usages. For example, a client usage constraint may define that a client may only retain certain types of data, that the client may only direct data to certain memory locations, that an amount of data used by the client must be below a threshold, or the like. In some exemplary embodiments, the client usage plugin may be configured to determine whether a usage of provided data complies with the one or more allowed usage, e.g., to identify any contract violations. In other cases or scenarios, any other non-data service may be provided in addition to or instead of the data service, resulting with utilization of any other software plugin.

Figure 3:
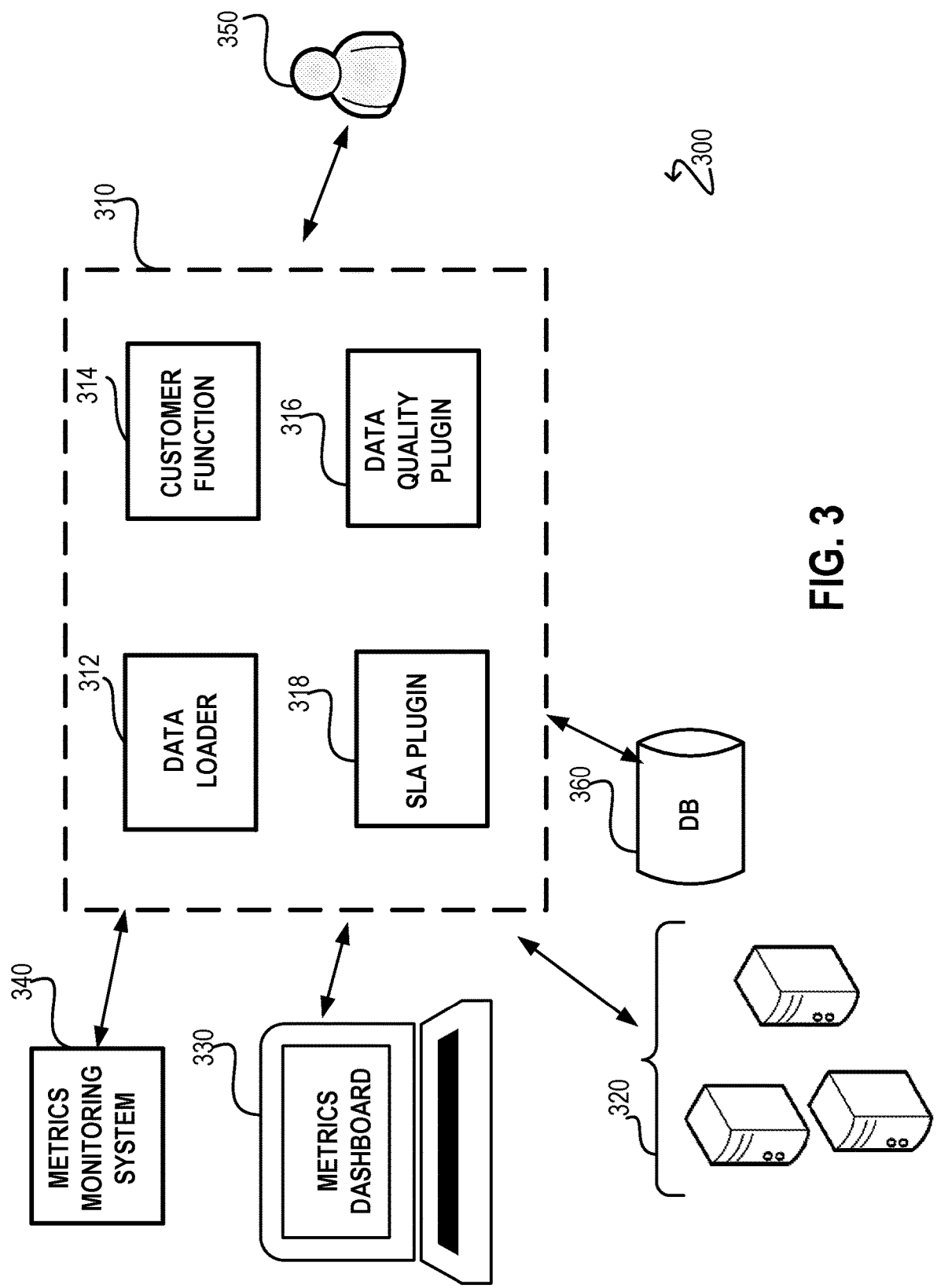
FIG. 3 illustrates a schematic illustration of an exemplary environment and architecture in which the disclosed subject matter may be utilized, in accordance with some exemplary embodiments of the disclosed subject matter.

Referring now to FIG. 3 showing an exemplary environment of a data sharing service, in accordance with some exemplary embodiments of the disclosed subject matter. In some exemplary embodiments, Customer 350 may correspond to Customer 150 of FIG. 1, and Database 360 may correspond to Database 160 of FIG. 1.

In some exemplary embodiments, environment 300 may comprise a plurality of executable components, such as contract template generators, configuration file generators, runtime specification file generators, runtime environment instantiators, contractable image builders, or the like (not shown).

In some exemplary embodiments, environment 300 may comprise a Runtime Environment 310 for providing a data sharing service, e.g., similar to Runtime Environment 110 of FIG. 1. In some exemplary embodiments, Runtime Environment 310 may be a secure environment that is configured according to a contract with Customer 350 and an associated runtime specification file retained at Database 360.

In some exemplary embodiments, Runtime Environment 310 may comprise a Data Loader 312, a Customer Function 314, a Data Quality Plugin 316, and an SLA Plugin 318. In some exemplary embodiments, Data Loader 312 may correspond to Data Loader 112 of FIG. 1, Customer Function 314 may correspond to Customer Function 114 of FIG. 1, and Data Quality Plugin 316 and SLA Plugin 318 may correspond to Plugins 116 of FIG. 1.

In some exemplary embodiments, a plurality of Data Servers 320 may be configured to serve data to one or more Customers 350 via Data Loader 312 in Runtime Environment 310. In some exemplary embodiments, Customer Function 314 may be configured to utilize the served data for one or more functionalities that are useful for Customers 350. In some exemplary embodiments, Customer Function 314 may be directly or indirectly managed by Customers 350.

In some exemplary embodiments, environment 300 may comprise a Metrics Monitoring System 340 that may be internal or external to Runtime Environment 310. In some exemplary embodiments, Metrics Monitoring System 340 may comprise an Application Programming Interface (API) of Runtime Environment 310 that enables Customers 350 to query Runtime Environment 310, to view real time measurements of metrics such as a current SLA state of data, or the like, e.g., in order to verify that the server provider does not violate the contract. In some exemplary embodiments, Metrics Monitoring System 340 may be configured to monitor one or more metrics of the data service, obtain one or more monitored metrics of the data service, e.g., from Data Quality Plugin 316 and SLA Plugin 318, record real-time metrics in a time series database, visualize the measured metrics, or the like. In some exemplary embodiments, Metrics Monitoring System 340 may provide the measured metrics to Metrics Dashboard 330, e.g., which may in turn display an overview of the measured metrics, e.g., to Customer 350.

In some exemplary embodiments, Metrics Dashboard 330 may display real-time information regarding the service. In some exemplary embodiments, the real time fields may depict metrics of the service that were captured in real time along with their value types, e.g., via a list, a user interface, or any other indication or manner.

In some exemplary embodiments, Runtime Environment 310 may comprise one or more data plugins such as Data Quality Plugin 316 and SLA Plugin 318. In some exemplary embodiments, Data Quality Plugin 316 may be configured to measure a data quality of the data service, e.g., based on a quantity of provided data, a date or freshness level of the provided data, or the like. For example, a low quantity of data or outdated data may indicate a lower quality of the data service, and vice versa. In some exemplary embodiments, Data Quality Plugin 316 may compare measured metrics to a corresponding constraint or value of the metric in the contract, e.g., to determine compliance with the contract.

In some exemplary embodiments, Customer 350 may request to view measured metrics of Data Quality Plugin 316. In some exemplary embodiments, the request may be forwarded to Customer Function 314, which in turn may query Data Quality Plugin 316 with regards to the metrics. In some exemplary embodiments, Data Quality Plugin 316 may indicate to Data Loader 312 that data metrics are requested to be monitored, and in return Data Loader 312 may mirror the data (provide identical or similar data), that may be typically provided to Customer Function 314, to Data Quality Plugin 316 as well. In other cases, Data Loader 312 may continuously mirror the data that is provided to Customer Function 314, to Data Quality Plugin 316, e.g., regardless of a request. Data Quality Plugin 316 may measure a quality of the mirrored data from Data Loader 312 and provide the measured metrics to Metrics Monitoring System 340, which may display the metrics on Metrics Dashboard 330, that may be viewed by Customer 350. Data Quality Plugin 316 may also provide the measured metrics to Customer Function 314, which in this case initially requested the metrics measurements.

In some exemplary embodiments, SLA Plugin 318 may be configured to measure SLA parameters of the data service such as availability of the data, mean time between failures (MTBF), mean time to recovery (MTTR), identifying which party is responsible for reporting faults, responsibility for data rates, throughput, jitter, or the like. In some exemplary embodiments, measured SLA metrics that were measured by SLA Plugin 318 may be compared to a corresponding constraint of the SLA commitments in the contract, e.g., to determine compliance with the contract.

In some exemplary embodiments, Customer 350 may request to view measured metrics of SLA Plugin 318. In some exemplary embodiments, the request may be forwarded to SLA Plugin 318, which in turn may query Metrics Monitoring System 340 with regards to the metrics, or determine SLA metrics independently. In some exemplary embodiments, Metrics Monitoring System 340 may provide the measured metrics to SLA Plugin 318, and display the metrics on Metrics Dashboard 330, that may be viewed by Customer 350.

Figure 4:
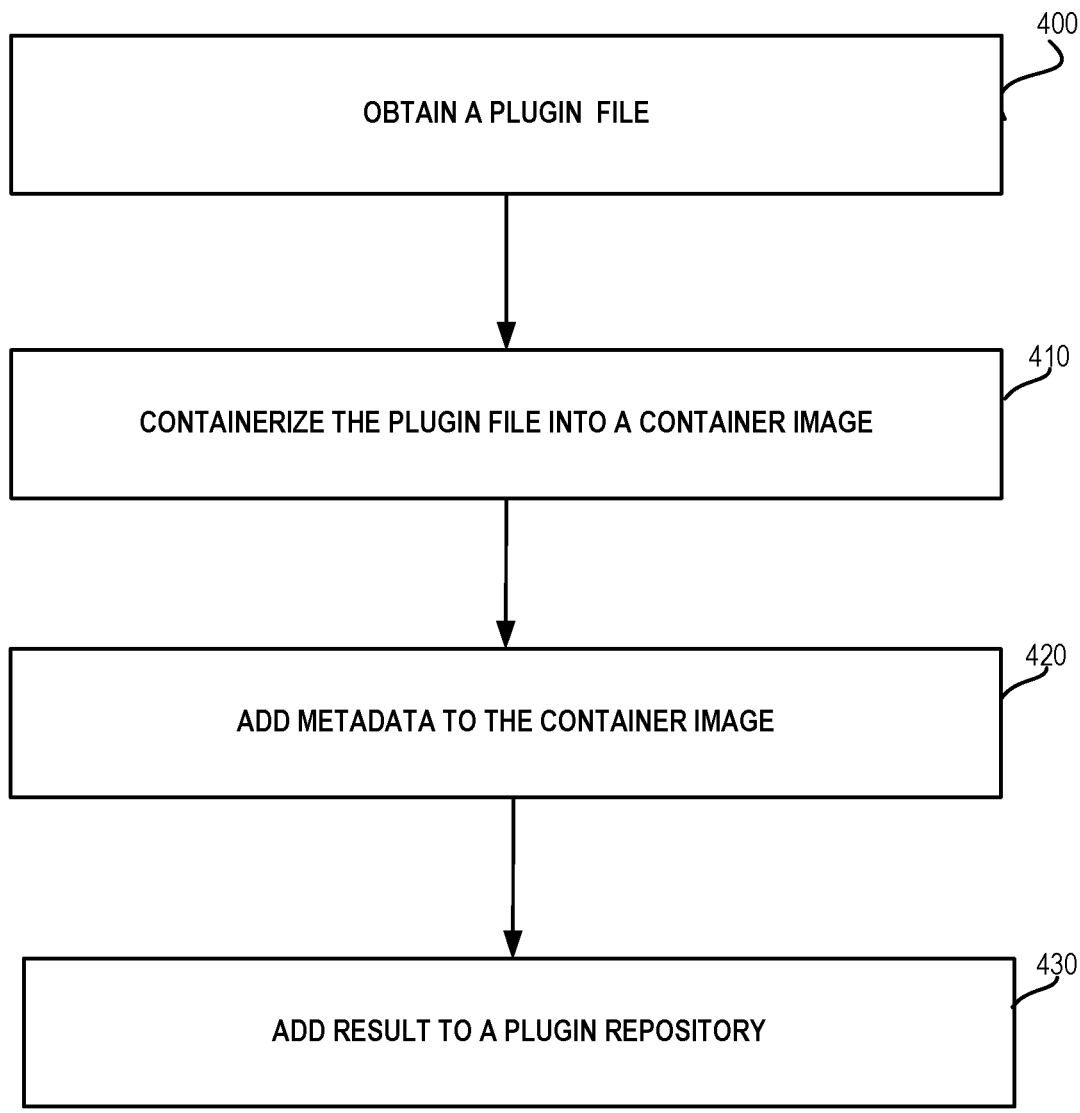
FIG. 4 illustrates a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On step 400, a plugin file may be generated, created, programmed, obtained, or the like. In some exemplary embodiments, the plugin file may be configured to measure or enforce one or more capabilities or metrics of a runtime environment. In some exemplary embodiments, the plugin file may constitute a building block of the runtime environment.

In some exemplary embodiments, the plugin file may comprise a software unit, an executable program, code, or the like. In some exemplary embodiments, the plugin file may be generated or created by a software programmer, a software developer, or the like, which may implement the plugin file in a programming language, a coding environment, or the like. In other cases, the plugin file may be obtained a third party such as a technology provider, open source databases, a server, a user, or the like.

On step 410, using one or more container techniques, the plugin file may be containerized, e.g., by being converted into a container plugin image, such as, for example, a docker image. In some exemplary embodiments, the software program of the plugin file may be containerized or converted into an independent contractable software unit that may be executed on one or more execution platforms or environments, e.g., using one or more container technologies such as Docker™. In some exemplary embodiments, the container plugin image may comprise a standalone, executable package of plugin software that may include code components, runtime components, system tools, system libraries, or the like. In some exemplary embodiments, containerizing the software of the plugins may enable each containerized plugin unit to be executed, with its dependencies, isolated from other processes. For example, a plugin file may be packaged as a containerized docker image that can be executed on a plurality of platforms such as a cloud platform having a Docker™ runtime execution environment. For example, a container of a plugin file may be created based on a docker file using the command "docker build <docker filename>", or any other similar command.

On step 420, metadata regarding the functionality or associated capabilities of the plugin file may be added, associated, linked, or the like, directly or indirectly to the container plugin image obtained from step 410. In some exemplary embodiments, the metadata may indicate a functionality of the plugin, a capability of a runtime environment associated with the plugin, enforcement means of the plugin, or the like.

In some exemplary embodiments, software of the container plugin image may be containerized together with the metadata, e.g., using at least one container technology. In some exemplary embodiments, the metadata may be added to the container plugin image manually by a user, or automatically such as by a software tool. For example, the metadata may be added to a docker image by entering LABEL commands to the plugin file. According to this example, the required LABEL commands may be entered into the plugin file, e.g., manually via a developer, or automatically via a software tool, setup assistant, software wizard, or the like. In other cases, the metadata may be added or associated to the plugins in any other manner, using any other technique.

On step 430, the plugin image, as well as the associated metadata, may be added or inserted to a plugin repository, e.g., to be used to create future contract templates. In some exemplary embodiments, container plugin images may be referred to as "plugins".

Figure 5:
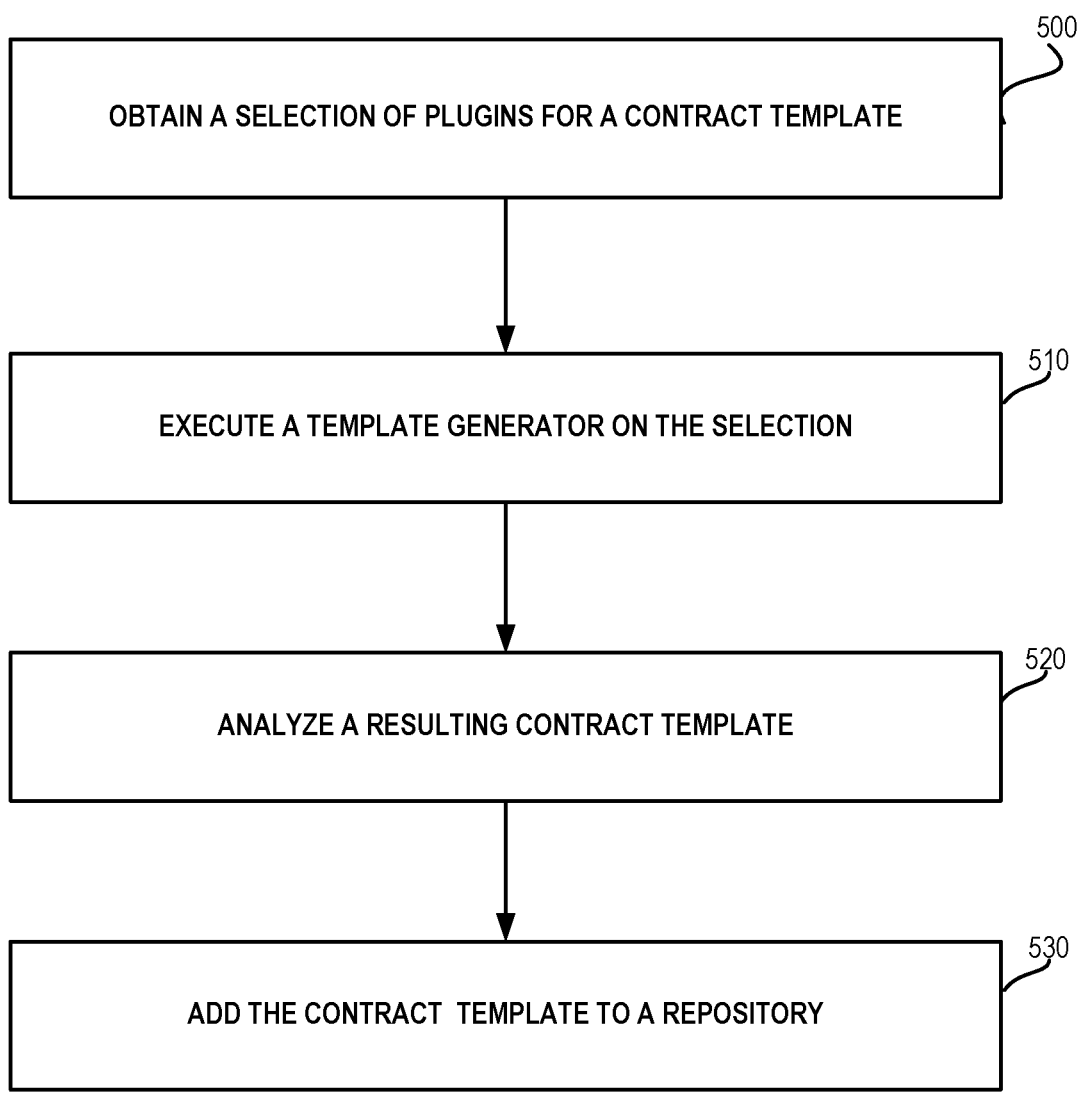
FIG. 5 illustrates a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On step 500, a selection of one or more plugins from a plugin portal may be obtained, e.g., by a template generator. In some exemplary embodiments, the template generator may be configured to generate or construct a contract template based on the one or more selected plugins. In some exemplary embodiments, the contract template may be configured to indicate terms and conditions under which a service of a runtime environment may be used by a customer. In some exemplary embodiments, the contract template may retrieve or obtain the one or more plugins and their associated metadata from a plugin repository comprising a set of plugins of the runtime environment. In some exemplary embodiments, the plugin portal or repository may retain a plurality of software plugins with associated metadata, e.g., as may be obtained from Step 430 of FIG. 4.

In some exemplary embodiments, the template generator may be operated by a legal person, a data governance officer, a service provisioning operator, or the like. In some exemplary embodiments, the template generator may generate one or more contract templates to include terms, conditions, or the like that are associated with using the service of the service provider. For example, for a data provider, the data owner may generate a data providing template indicating conditions of using the data.

On step 510, the template generator may be executed, run, or the like, with one or more parameters such as an indication of one or more selected plugins, a target language in which the contract template should be written, or the like. In some exemplary embodiments, based on the execution, the template generator may output or generate a contract template comprising a plurality of clauses, input fields, or the like. In some exemplary embodiments, the template generator may generate the contract template based on the metadata of the selected plugins, based on information regarding the service provider, or the like.

In some exemplary embodiments, the template generator may generate plugin clauses that match the metadata of the one or more selected plugins. In some exemplary embodiments, the plugin clauses may textually describe the selected plugins. In some exemplary embodiments, the template generator may analyze the plugin metadata and add plugin clauses associated with the plugins' metadata to the contract template. In some exemplary embodiments, the plugin clauses may comprise one or more input fields that enable to input one or more types of values to metric parameters. In some exemplary embodiments, the template generator may add to the contract states of plugins such as a development state, a testing phase, a production state, or the like.

In some exemplary embodiments, in addition to the plugin clauses, the template generator may generate additional clauses, such as general clauses including standard sections of a contract. In some exemplary embodiments, the template generator may add business related clauses, text, or the like, according to a business strategy or requirements of the service provider. In some exemplary embodiments, the template generator may add to the generated template legal clauses, information about the service provider, jurisdiction information, or the like. In some exemplary embodiments, the additional clauses may or may not include one or more input fields such as a desired price the client wishes to pay, or the like.

In some exemplary embodiments, the template generator may generate in the contract template one or more input fields, which may be configured to be filled out by the client such as by selections of values for parameters from a list of options, by manually providing a price input, or the like. In some exemplary embodiments, the user input may be provided by the client manually such as by selecting a value, providing free-text input, or the like, or automatically, e.g., via a software tool or wizard.

In some exemplary embodiments, the input fields of the plugin clauses may be associated with one or more metrics, parameters, or the like, that are configured to be measured or enforced by the selected plugins. In some exemplary embodiments, the one or more metrics, parameters, or the like may be obtained from plugin metadata describing the plugin functionality, from opensource databases, or the like. In some exemplary embodiments, a software tool or wizard may be configured to validate user input by determining whether inputted values of the client match the capabilities of the environment and by rejecting values that are not valid. Alternatively, the client may be required to select an input value from a list of valid suggestions that match the capabilities of the environment.

In some exemplary embodiments, the input fields of the plugin clauses may be configured to only enable input that complies with technical capabilities of the runtime environment, with a functionality of the runtime environment, with a type of the service provided by the runtime environment, or the like.

In some cases, some input fields may be filled in automatically based on information associated with the client. As an example, upon registration of a client to obtain the service of the service provider, an organization or corporation name of the client may be added automatically for each contract that is generated for the client. As another example, a contact name or contacting medium, e.g., an email, of the client that was added during the registration process may be added automatically to the contract template.

In some exemplary embodiments, the template generator may configure the contract template to be displayed in an editing mode, e.g., to enable clients to provide their input.

On step 520, before approving the contract template, the contract template may be reviewed or analyzed, e.g., by an operator of the template generator, by an automated program, or the like. In some exemplary embodiments, the contract template may be analyzed to identify any contradictions therein, issues, mistakes, or the like. In case a mistake was found, the contract template may be edited or modified accordingly.

On step 530, the contract template, which may or may not be modified by Step 520, may be approved and added to a template repository, e.g., to be retained or stored for future use of clients.

Referring now to FIG. 6 showing a flowchart diagram of a method, in accordance with some exemplary embodiments of the disclosed subject matter.

On step 600, a customer may select a contract template from a group of contract template that are presented to the customer, e.g., via a template repository, a template portal, or the like. In some exemplary embodiments, only relevant contract templates may be presented to the customer. In some cases, contract templates may be relevant only for a certain geographical location, a certain type of client corporation, a certain objective, or the like, and only the relevant contract templates may be displayed to each client. For example, a first client from the United States may obtain a list of contract templates in English, while a second client from Russia may obtain a different list of contract templates in Russian. In other cases, all contract templates may be presented to all clients, or some templates may be presented to any other group of clients based on any other criteria such as the purpose for which the requested data is intended to be used.

In some exemplary embodiments, the customer may obtain a copy of the selected contract template so that he can fill in the input fields of the contract. In some cases, the customer may request the copy of the selected contract template and receive the copy of the selected contract only when his request is approved.

On step 610, after obtaining the copy of the contract template, the customer may insert input such as select values for parameters of clauses, input free text in free text elements, or the like. For example, for a data service, the customer may select a data quality level that he wishes to obtain, e.g., in terms of data size, data age, or the like. In some cases, the customer may select values for SLA parameters that he wishes to obtain such as a desired number of times per minute or day that the service should enable to be accessed, a desired bandwidth, or the like. In some exemplary embodiments, valid values that enable selection may include values of metrics that can technically be provided by the runtime environment. For example, the contract template configuration may not allow a user to select a desired bandwidth that does not comply with the technical capabilities of the runtime environment. Alternatively, the client may enter any value including invalid values, but the contract may not be signed by the runtime environment. For example, an alert may be presented indicating that the selected value is not supported.

In some exemplary embodiments, in addition to values of metrics parameters, the client may fill in any other information such as personal information, organization or firm information, or the like. In some exemplary embodiments, after filling in the input fields the customer may sign and submit the contract for approval.

On step 620, the contract may be signed between the customer and the service provisioning party, e.g., automatically or manually, upon verifying that both parties agree to the terms and conditions of the contract. In some exemplary embodiments, upon signing the contract, the contract may be provided to a runtime configuration generator that may be configured to generate a deployment configuration file (referred to as "runtime specification file") based on the contract. In some exemplary embodiments, the resulting contract may simultaneously be sent to a contract repository that is configured to store active contracts.

In some exemplary embodiments, the runtime configuration generator may be configured to generate for each received contract a corresponding runtime specification file such as a deployment configuration file, a YAML file, or the like, based on the user inputs to the contract. In some exemplary embodiments, the runtime specification file may be used to configure a runtime environment and its component according to the user inputs and constraints.

On step 630, the runtime specification file of the contract may be provided to a runtime instantiator, which may manage execution of an instance of the runtime environment and configure its components according to the runtime specification file. In some exemplary embodiments, the runtime environment instance may be located in a computing cloud, a server, or the like. In some exemplary embodiments, the runtime instantiator may execute the plugins that are configured to measure or enforce metrics indicated by the runtime specification file, configure the plugins according to the runtime specification file, load the service, execute the customer function, create one or more namespaces such as the Kubernetes namespace, or the like.

In some exemplary embodiments, the runtime environment instance may enable to evaluate compliance with the contract in real time. In some exemplary embodiments, one or more components of the runtime environment instance may compare the real time metrics measurements of the service that is provided to the client, the manner in which it is provided, or the like, with the terms defined by the contract.

In some exemplary embodiments, measuring actual service metrics with expected service metrics may be performed by one or more plugins such as a data quality plugin, which may measure the quantity and a freshness level of the data, and possibly more sophisticated parameters such as a distribution of the data with regard to different features. In some exemplary embodiments, measurement results from the data quality plugin may be compared to the required data quality parameters of the contract, to determine compliance with the contract. In some exemplary embodiments, a data interface plugin may be configured to log SLA metrics or any other metrics regarding the number of calls to the data mesh, the amount of data passed in and out of the customer function, response times to service requests, or the like. In some exemplary embodiments, the data interface plugin may compare the logged metric values to contract requirements in order to determine compliance or violation of the contract. In some exemplary embodiments, any other component or plugin may be utilized in order measure actual service with expected or required service.

In some exemplary embodiments, metrics values collected by one or more measuring components may be stored and compared against constraints of the contract. In some exemplary embodiments, clients may obtain an Application Programming Interface (API) of the runtime environment in order to enable the clients to query the runtime environment, to obtain real time measurements of metrics such as a current SLA state of data, or the like.

Figure 7:
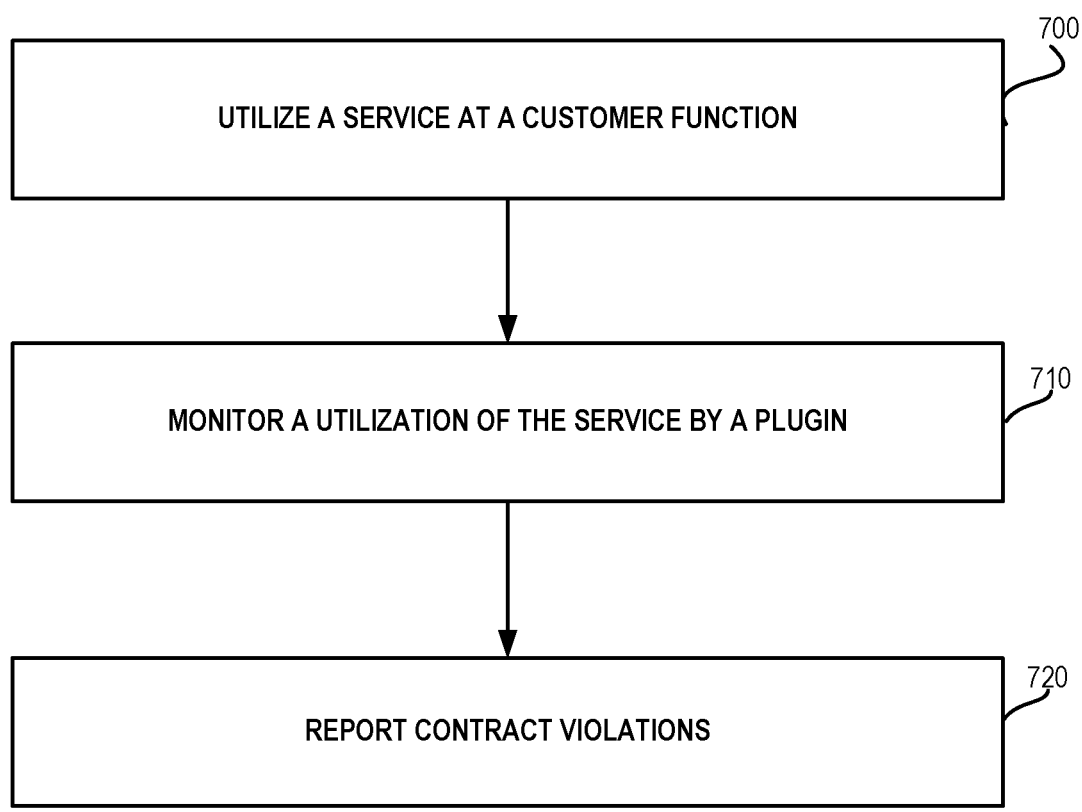
FIG. 7 illustrates a flowchart diagram of a method, in accordance with some exemplary embodiments of the disclosed subject matter.

Referring now to FIG. 7 showing a flowchart diagram of a method, in accordance with some exemplary embodiments of the disclosed subject matter.

On step 700, a client having an active contract with a service provider may utilize one or more functionalities of a customer function in the runtime environment of the contract. For example, for a data service, the client may configure the customer function to utilize the data for one or more functionalities that are useful for the client, such as analyzing the data to determine one or more insights, accumulating data statistics, training a neural network, or the like.

On step 710, upon utilizing or activating a functionality of the customer function, a software plugin, e.g., Plugins 316 and 318 of FIG. 3, that may be deployed within a wrapper wrapping the customer function may monitor the performed functionality in real time. In some exemplary embodiments, the plugin may be configured to monitor one or more metrics that are associated with the performed functionality, such as an amount of data that is used, where is the data directed to, or the like, and log the measured metrics. In some exemplary embodiments, aside from the customer function, one or more components of a development environment of the client may be wrapped as well.

On step 720, upon identifying that the performed functionality of the customer function violates one or more terms of the contract, the plugin may report the issue to the runtime environment, alert the client, terminate the service distribution, or perform any other responsive action. For example, a clause in the contract may define that data may not be directed by the client outside the runtime environment. A plugin may monitor an amount of data that is directed out of the runtime environment and determine whether the measured amount indicates that a violation was performed.

In some exemplary embodiments, during an active period of the contract, the client may be enabled to activate, pause, and terminate the contract. In some exemplary embodiments, during an active period of the contract, the client may monitor the status of live plugins, view plugin endpoint details, view runtime component details, view the customer function details, or the like. In some exemplary embodiments, the client may also view own usage data, his own monetary transactions, bills, or the like.

In some exemplary embodiments, at an end of a contract period, upon terminating the runtime environment instance, or the like, a final report relating to service parameters, e.g., an SLA level of data, may be generated and stored together with the original contract.

Figure 8:
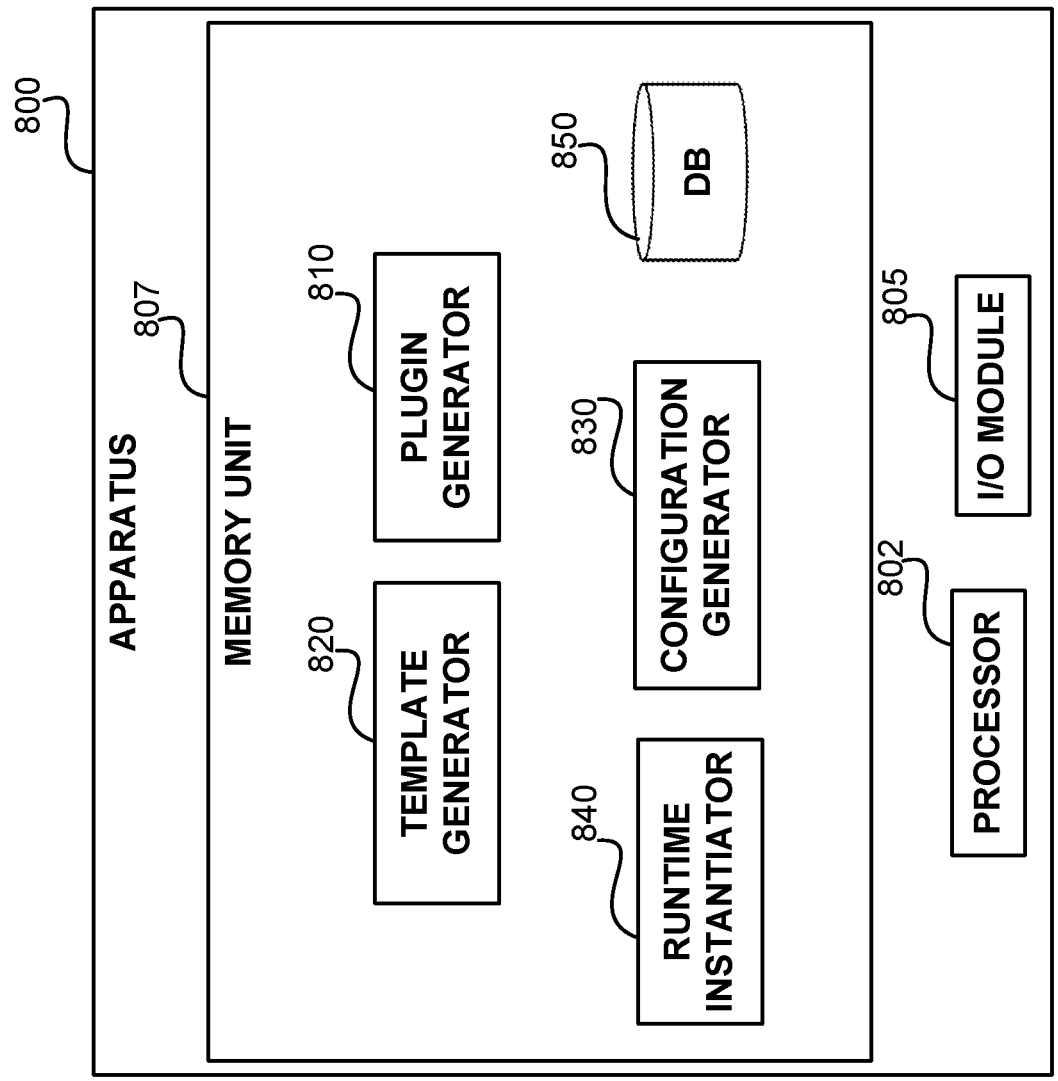
FIG. 8 illustrates a block diagram, in accordance with some exemplary embodiments of the disclosed subject matter.

Referring now to FIG. 8, showing an apparatus in accordance with some exemplary embodiments of the disclosed subject matter.

In some exemplary embodiments, Apparatus 800 may be part of one or more cloud servers, one or more remote servers, Domain Name System (DNS) servers, Gateway (GW) servers, virtual private network (VPN) servers, Personal Computers (PCs), a combination thereof, or the like.

In some exemplary embodiments, Apparatus 800 may comprise a Processor 802. Processor 802 may be a CPU, a microprocessor, an electronic circuit, an Integrated Circuit (IC) or the like. Processor 802 may be configured to execute computer-programs useful in performing the methods of FIGS. 2, 4, 5, 6, 7, or the like.

In some exemplary embodiments of the disclosed subject matter, an Input/Output (I/O) Module 805 may be utilized to communicate with one or more servers of computing devices, to provide an output to and receive input from a user, or the like. I/O Module 805 may be operatively coupled to a touch screen, a mouse, a keyboard or a similar device which may be used for receiving input from the user. I/O Module 805 may be operatively coupled to a display (not shown), speaker (not shown) or a similar device which may be used for providing feedback or reports to the user. I/O Module 805 may further be used to transmit and receive information to and from the user or any other apparatus in communication therewith such as Server 120 and DB 160 of FIG. 1. For example, I/O Module 805 may be configured to receive service packages or data from Server 120 of FIG. 1, to obtain active contracts, contract templates, plugins, configuration or runtime specification files, or the like, from DB 160 of FIG. 1, to provide reports and metric measurements regarding the service to the user, and to provide alerts the customer, the client, the operator, or the like.

In some exemplary embodiments, Apparatus 800 may comprise a Memory Unit 807. Memory Unit 807 may be a short-term storage device or long-term storage device. Memory Unit 807 may be a persistent storage or volatile storage. Memory Unit 807 may be a disk drive, a Flash disk, a Random Access Memory (RAM), a memory chip, or the like. In some exemplary embodiments, Memory Unit 807 may retain program code operative to cause Processor 802 to perform acts associated with any of the subcomponents of Apparatus 800. In some exemplary embodiments, Memory Unit 807 may retain program code operative to cause Processor 802 to perform acts associated with any of the steps in FIGS. 2, 4, 5, 6, 7, or the like.

Memory Unit 807 may be utilized to retain DB 850 including one or more repositories or databases retaining active contract, contract templates, plugins, configuration files, runtime specification files, or the like. Alternatively, DB 850 may be external to Memory Unit 807, e.g., may be located in a server, but may enable access to its content via one or more components of Apparatus 800 such as I/O Module 805.

The components detailed below may be implemented as one or more sets of interrelated computer instructions, executed for example by Processor 802 or by another processor. The components may be arranged as one or more executable files, dynamic libraries, static libraries, methods, functions, services, or the like, programmed in any programming language and under any computing environment.

Memory Unit 807 may comprise Plugin Generator 810, which may be configured to generate one or more software plugins that are configured to measure or enforce one or more metrics of a service. In some exemplary embodiments, Plugin Generator 810 may be configured to add or associate each generated plugin with corresponding metadata which may describe a functionality of the plugin, a description of the plugin, a description of a capability associated with the plugin, a manner of enforcing a constraint on the capability, enforcement means of the plugin, or the like.

Memory Unit 807 may comprise Template Generator 820, which may be configured to generate one or more contract templates that are configured to measure or enforce one or more metrics of a service. In some exemplary embodiments, Template Generator 820 may generate each contract template based on a selection of one or more generated plugins for the contract template, e.g., by utilizing metadata of each plugin to create associated clauses.

Memory Unit 807 may comprise Configuration Generator 830, which may be configured to receive a copy of a contract template that is associated with one or more plugins, and user input that was inserted thereto. In some exemplary embodiments, Configuration Generator 830 may generate a deployment configuration file based on the user input and the metrics of the associated plugins. In some exemplary embodiments, the deployment configuration file may be used for configuring one or more components of a runtime environment to match the user input and the metrics of the associated plugins.

Memory Unit 807 may comprise a Runtime Instantiator 840, which may be configured to obtain the configuration file from Configuration Generator 830, and generate a runtime environment by loading a service thereto, configuring and executing the associated plugins according to the configuration file, configuring and executing the customer function according to the configuration file, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining metadata associated with at least one plugin from a set of plugins of a runtime environment, wherein the runtime environment is configured to provide a service to a client, wherein the at least one plugin is configured to measure or enforce one or more metrics of the service;
obtaining one or more user selections regarding the one or more metrics, wherein the one or more user selections comprise one or more constraints on the runtime environment;
obtaining, based on the metadata of the at least one plugin and based on the one or more user selections, one or more corresponding clauses textually describing the one or more constraints;
generating a contract, wherein the contract comprises the one or more corresponding clauses;
automatically generating a configuration file based on the one or more user selections; and
automatically enforcing the contract at least by:
activating the runtime environment,
loading the service in the runtime environment,
configuring the at least one plugin according to the configuration file,
executing the at least one plugin to identify a violation of the contract, and
executing a client function of the client.

2. The method of claim 1 comprising identifying the violation of the contract, wherein said identifying is performed by a plugin of the at least one plugin that is deployed in a wrapper wrapping the client function.

3. The method of claim 1 comprising performing a responsive action upon identifying the violation, wherein the responsive action comprises at least one of generating an alert or terminating the service.

4. The method of claim 1, wherein the metadata comprises, for each plugin of the at least one plugin, at least one of: a description of the plugin, a description of a capability associated with the plugin, and a manner of enforcing a constraint on the capability.

5. The method of claim 1 comprising generating the set of plugins at least by containerizing software of the at least one plugin together with the metadata using a container technology.

6. The method of claim 1 comprising:
retrieving the at least one plugin and the metadata that is associated thereto from a plugin repository comprising the set of plugins of the runtime environment; and
generating a contract template based on the metadata, wherein the contract template is generated to include plugin clauses textually describing the at least one plugin.

7. The method of claim 1 comprising:
executing a template generator on the metadata to generate a contract template comprising input fields that are associated with the one or more metrics, wherein the contract template is associated with the at least one plugin, wherein the input fields enable the client to provide the one or more user selections by inserting the one or more user selections to the input fields, and
adding the contract template to a contract template repository that is accessible to the client, wherein the one or more corresponding clauses are generated based on the contract template with the one or more user selections.

8. The method of claim 1 comprising:
obtaining a contract template from a contract template repository, wherein said generating the contract is performed based on the contract template; and
legally signing the contract with the service provider to obtain access to the runtime environment that enables to perform said automatically enforcing.

9. The method of claim 1, wherein the service comprises a data service, wherein the at least one plugin comprises a data quality plugin that is configured to measure or enforce a data quantity metric of the service and a data freshness metric of the service, wherein the at least one constraint comprises a quality threshold, wherein the one or more corresponding clauses textually define the quality threshold, wherein the data quality plugin is configured to determine whether a data quality of provided data complies with the quality threshold.

10. The method of claim 1, wherein the service comprises a data service, wherein the at least one plugin comprises an anonymization plugin that is configured to measure or enforce an anonymization metric of the service provider, wherein the anonymization metric defines one or more anonymization levels, wherein the at least one constraint comprises an anonymization level selection from the one or more anonymization levels, wherein the one or more corresponding clauses textually define that the service must comply with the anonymization level selection, wherein the anonymization plugin is configured to determine whether the measured level complies with the anonymization level selection.

11. The method of claim 1, wherein the service comprises a data service, wherein the at least one plugin comprises a service-level agreement (SLA) plugin that is configured to measure or enforce a SLA metric of the service defining one or more SLA levels of the service, wherein the at least one constraint comprises a SLA level selection from the one or more SLA levels, wherein the one or more corresponding clauses textually define the SLA level selection, wherein the SLA plugin is configured to determine whether a SLA level of provided data complies with the SLA level selection.

12. The method of claim 1, wherein the service comprises a data service, wherein the at least one plugin comprises a client usage plugin that is configured to measure or enforce a data usage metric of the service, wherein the at least one constraint comprises one or more allowed usages, wherein the one or more corresponding clauses textually define the one or more allowed usages, wherein the client usage plugin is configured to determine whether a usage of provided data complies with the one or more allowed usages.

13. The method of claim 12, wherein the one or more allowed usages define that the provided data can only be directed to one or more memory locations.

14. The method of claim 1, wherein the contract defines that the service is to be provided during a service period, wherein said automatically enforcing is performed during the service period.

15. A computer program product comprising a non-transitory computer readable storage medium retaining program instructions, which program instructions when read by a processor, cause the processor to perform the steps of:
- obtaining metadata associated with at least one plugin from a set of plugins of a runtime environment, wherein the runtime environment is configured to provide a service to a client, wherein the at least one plugin is configured to measure or enforce one or more metrics of the service;
- obtaining one or more user selections regarding the one or more metrics, wherein the one or more user selections comprise one or more constraints on the runtime environment;
- obtaining, based on the metadata of the at least one plugin and based on the one or more user selections, one or more corresponding clauses textually describing the one or more constraints;
- generating a contract, wherein the contract comprises the one or more corresponding clauses;
- automatically generating a configuration file based on the one or more user selections; and
- automatically enforcing the contract at least by:
  - activating the runtime environment,
  - loading the service in the runtime environment,
  - configuring the at least one plugin according to the configuration file,
  - executing the at least one plugin to identify a violation of the contract, and
  - executing a client function of the client.

16. The product of claim 15, wherein the program instructions, when read by a processor, cause the processor to identify the violation of the contract, wherein said identifying is performed by a plugin of the at least one plugin that is deployed in a wrapper wrapping the client function.

17. The product of claim 15, wherein the program instructions, when read by a processor, cause the processor to perform a responsive action upon identifying the violation, wherein the responsive action comprises at least one of generating an alert or terminating the service.

18. The product of claim 15, wherein the metadata comprises, for each plugin of the at least one plugin, at least one of: a description of the plugin, a description of a capability associated with the plugin, and a manner of enforcing a constraint on the capability.

19. The product of claim 15, wherein the program instructions, when read by a processor, cause the processor to generate the set of plugins at least by containerizing software of the at least one plugin together with the metadata using a container technology.

20. A system, the system comprising a processor and coupled memory, the processor being adapted to perform:
- obtaining metadata associated with at least one plugin from a set of plugins of a runtime environment, wherein the runtime environment is configured to provide a service to a client, wherein the at least one plugin is configured to measure or enforce one or more metrics of the service;
- obtaining one or more user selections regarding the one or more metrics, wherein the one or more user selections comprise one or more constraints on the runtime environment;
- obtaining, based on the metadata of the at least one plugin and based on the one or more user selections, one or more corresponding clauses textually describing the one or more constraints;
- generating a contract, wherein the contract comprises the one or more corresponding clauses;
- automatically generating a configuration file based on the one or more user selections; and
- automatically enforcing the contract at least by:
  - activating the runtime environment,
  - loading the service in the runtime environment,
  - configuring the at least one plugin according to the configuration file,
  - executing the at least one plugin to identify a violation of the contract, and
  - executing a client function of the client.

* * * * *